United States Patent Office 3,227,038
Patented Jan. 4, 1966

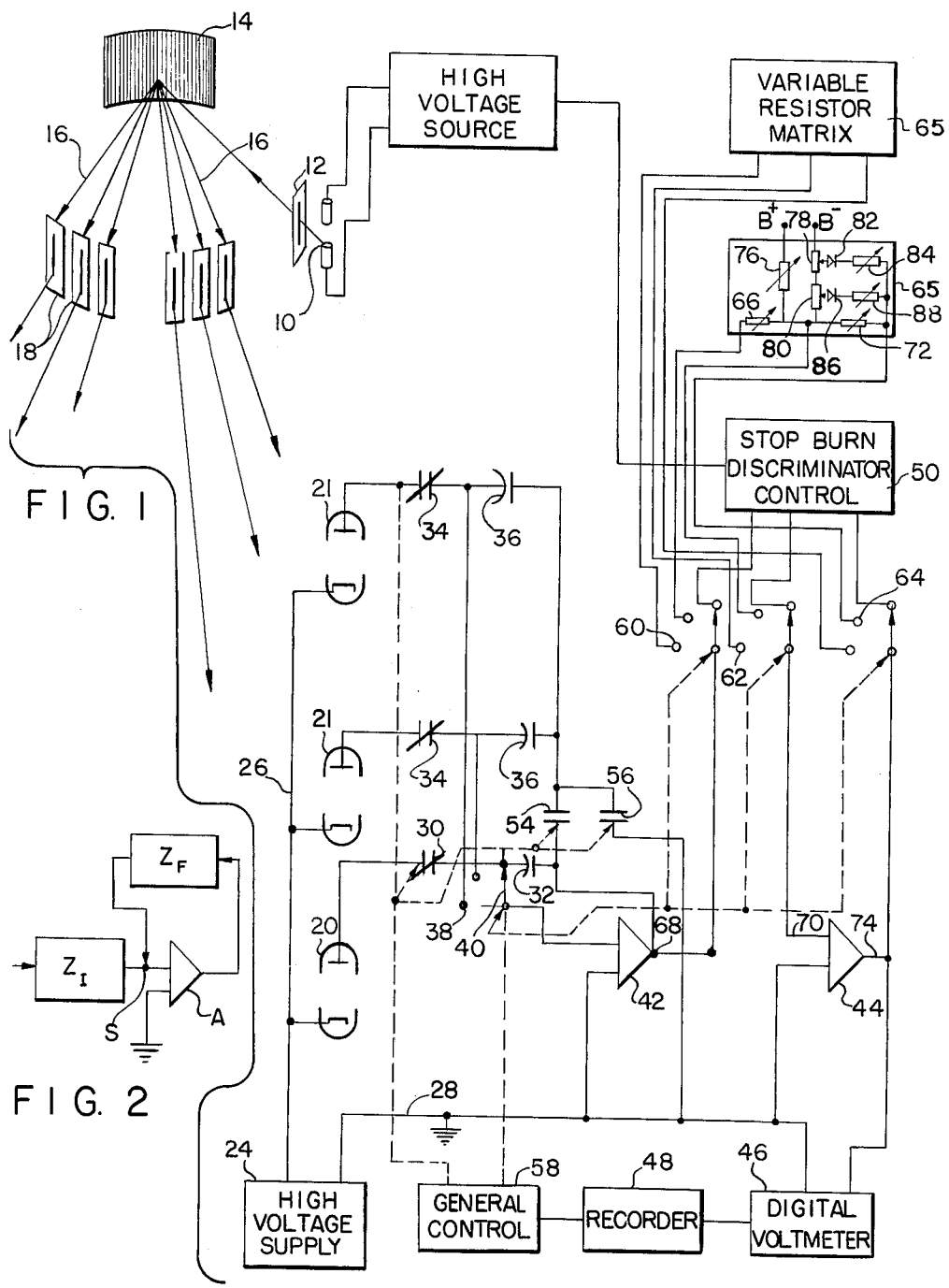

3,227,038
SPECTROSCOPE WITH DIFFERENTIAL AMPLIFIER EXPOSURE CONTROL
Frank N. Earle, Watertown, Mass., assignor to Baird-Atomic, Inc., Cambridge, Mass., a corporation of Massachusetts
Filed Oct. 5, 1962, Ser. No. 228,617
2 Claims. (Cl. 88—14)

The present invention relates to spectrum analysis, and more particularly to spectrometers of the so-called "direct reading" type which automatically indicate the chemical composition of a specimen by determining the intensity distribution of radiation of characteristic wavelengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit radiation of preselected wavelengths to photocell channels in order to determine the differing intensities of the radiation at these wavelengths. In a typical spectrometer readout, the photocell channels include capacitors, which build up charges that correspond to the intensities of the preselected wavelengths. Problems have been encountered in the calibration of such a capacitor readout. The present invention contemplates a novel spectrometer readout characterized by reduced delicacy of adjustment and increased high precision.

Because of irregularities in the production of radiation by the emission source, it is desirable to obtain an average of the current from any photocell tube that represents the intensity of its associated spectrum line flux. This is done by integrating the current over a period of time, typically 10 or 20 seconds. It has been successful practice to compare the unknown spectrum line to be anaylzed with a reference spectrum line. The reference line may be a line in the matrix element, e.g. an iron line in steel analysis, or it may be the central image of the source reflected by the grating, in which case it is a measure of total radiation. An object of the present invention is to utilize a differential amplifier for controlling the exposure period of all channels by the establishment of a reference voltage which is determined when the voltage across the capacitor in a reference channel reaches a predetermined value.

From the direct voltage representing the flux measured by the photocell must be substracted stray flux not arising from the spectrum line itself. This is the amount of flux corresponding to a zero concentration. Also, to be a direct analog of concentration in percentage or parts per million, the voltage must be multiplied by some coefficient. Thus, for example, 50 volts may be made equivalent to 500 parts per million, or to 5%. Further, for some of the spectrum lines of interest, it is found by checking against standard samples, that after subtracting background, the light measured in the spectrum line is a linear function of concentration of the element so that multiplication by a constant coefficient will produce an accurate analog. However, for some lines, the measured radiation is a non-linear function of concentration. In this case analogue computer techniques enable convenient multiplication by a non-linear function. Another object of the present invention is to functionally operate on the voltage representation of unknown spectrum lines by means of an operational amplifier.

A direct voltage provided by a differential amplifier may be measured by a voltage method that draws considerable current. A digital voltmeter may be used advantageously since it is available at competitive prices, is reliable in operation and can be applied to directly drive a card punch or other digital recording device. A further object of the present invention is to convert the analog representation produced by a differential amplifier of the foregoing type to a digital representation by means of a digital voltmeter.

Other objects of the present invention will in part be obvious and will in part appear hereinafter.

The invention accordingly comprises the system comprising the features, properties and relation of components that are exemplified in the following detailed disclosure, the scope of which will be indicated in the appended claims.

For a fuller understanding of the nature and objects of the present invention, reference should be had to the following detailed description, taken in connection with the accompanying drawings wherein:

FIG. 1 is a diagram, partly in mechanical perspective and partly in electrical schematic, of a preferred embodiment of the present invention; and FIG. 2 is an electrical schematic of a component of the system of FIG. 1.

Generally, the embodiment of the present invention illustrated in FIG. 1 comprises an electrically excited gap 10 for an unkown specimen, an entrance slit 12 for radiation from gap 10, a curved diffraction grating 14 for dispersing radiation from entrance slit 12 into a spectrum, rays of which are shown at 16, and a plurality of exit slits 18 for transmitting isolated wavelengths of the spectrum from grating 14. A bank of photocells are provided to receive wavelengths 16, photocell 20 being positioned to receive the reference spectrum line and sequence of photocells 21 being positioned to receive unknown spectrum lines. This spectrometer is of the type more specifically described in Patent No. 2,937,561, issued in the name of J. L. Saunderson et al. on May 24, 1960, for Spectroscopic Apparatus. Each of photocells 20 and 21 generates a signal for a wavelength intensity comparison to be described below.

The circuit for performing this comparison is shown generally as being energized by a high voltage supply 24 one lead of which is shown at 26 as being connected to the cathodes of photocells 20 and 21 and the other lead of which is grounded as at 28. By way of example, the voltage difference between leads 26 and 28 is of the order of 1000 volts. The anode of photocell 20 is connected through a normally closed switch 30 to a capacitor 32 and the anodes of bank of photocells 21 are connected through a sequence of normally closed switches 34 to a sequence of capacitors 36. Connected from the junctions between these switches and these capacitors are the contact points 38 of a multi-position switch 40.

The voltages generated across capacitors 32 and 36 are applied to a pair of operational amplifiers 42 and 44 in the manner now to be described. With reference for the moment to FIG. 2, the operational amplifiers herein are of the type in which $G = Z_F/Z_I$, where G is gain, $Z_I$ is input impedance, $Z_F$ is feedback impedance, A designates an amplifying stages and S, which is termed the summing point, remains at ground potential. Such an operational amplifier is shown in detail at page 226 and described in Korn and Korn, Electronic Analog Computers, McGraw-Hill Book Company, second edition, 1956, Operational amplifiers 42 and 44 are in association with a digital voltmeter 46 and a recorder 48. In order to obtain a comparison of unknown spectrum line intensities with the reference spectrum line intensity, the circuit initially is caused by a suitable control circuit 50 to monitor and track the increasing voltage generated by phototube 20 in the reference channel during the course of emission from source 10. A general control 58 initially establishes aforementioned switches 30 and 34 in normally closed condition, a switch 54 in normally open condition and a switch 56 in normally closed condition. When the output voltage of reference capacitor 32 reaches a preset value, say 50 volts, the reading is stopped by control 50 which cuts off transmission from source 10. At this point, general control 58 opens switches 30 and 34 to disconnect the phototubes from the capacitors, closes switch 54 to couple capacitors 36 to operational amplifier 42 and opens switch 56 to decouple the capacitors from ground. Now general control 58, in synchonism, steps multi-position switch 40 and multi-position switches 60, 62, 64 successively in order to couple successive capacitors 34 and successive resistor matrices 65 into operative association with operational amplifiers 42 and 44. As may be seen in FIG. 1, resistor matrixes 65 are shown as being the extreme upper right two blocks, the upper one of which is designated generally as "variable resistor matrix" and the lower one of which is illustrated specifically with exemplary circuitry. Thus the integration of current from the reference spectrum line is used to measure the time period over which all other photomultiplier currents are integrated.

It will be understood that the two resistor matrixes shown at the upper right in FIG. 1 are associated respectively with the two capacitors shown at 36. Each of these matrixes, when taken in turn with operational amplifier 44, serves as a non-linear function generator with respect to the output of first operational amplifier 42. Immediately following is first a description of the components of the matrix that is illustrated in detail and then a characterization of the purposes these components serve. Each matrix includes a resistor 66 which is connected between output terminal 68 of first operational amplifier 42 and input terminal 70 of second operational amplifier 44, a resistor 72 which is connected between input 70 of second operational amplifier 44 and output 74 of second operational amplifier 44. Connected between B+ and a point between resistor 66 and input terminal 70 of second operational amplifier 44 and resistor 72 are a pair of resistors 78 and 80 in which are in series. The variable tap of resistor 78 is connected to a diode 82 and a resistor 84 which are in series and the variable tap of resistor 80 is connected to a diode 86 and a resistor 88 in series. The other terminals of resistors 82 and 84 are connected to the output terminal of second operational amplifier 44. By adjustment of variable resistors 66 and 72, the output of first operational amplifier 42 in effect is multiplied by a constant. Variable resistor 76 serves to add a constant. Variable resistors 84 and 88 serve as non-linear multipliers since diodes 82 and 86 conduct only when the voltage reaches a certain level.

In operation, stepping switch 40 and stepping switches 60, 62, 64, successively apply the output of a selected capacitor 36 to first operational amplifier 42 and apply the resulting output of first operational amplifier 42 through a selected matrix 65 to second operational amplifier 44. In other words, with extreme simplicity and accuracy, the analog value of the voltage across a selected capacitor 36 is mathematically operated upon by a corresponding matrix 65 for conversion to an output form appropriate for application to digital voltmeter 46. Digital voltmeter 46 balances on the voltage generated. When balance is achieved, a signal is applied to recorder 48, for example a card punch, and the number represented by the voltage is recorded. At the end of the recording operation, a signal is returned from recorder 48 to control circuit 58 in order to reset the system. In operation, initially control 58 is actuated and the sample at source 10 is energized for a period during which capacitor 32 charges to a preset value. When capacitor 32 reaches this value, switches 30, 32, 34, 36, 54 and 56 are actuated by stop burn control 50. Thereafter, one-by-one the voltages on capacitors 36 are compared by the nonlinear function generator with the reference voltage across capacitor 32.

The present invention thus provides an improved spectrometer output circuit for automatically recording spectrometer results. Since certain changes may be made in the above disclosed device without departing from the scope of the invention disclosed herein, it is intended that all matter shown in the accompanying drawings and described in the foregoing specification be interpreted in an illustrative and not in a limiting sense.

What is claimed is:

1. Spectroscopic apparatus comprising an electrically energized source for exciting a specimen to emit radiation, means providing an entrance slit for transmitting said radiation from said source, a curved grating for diffracting said radiation from said entrance slit into a spectrum, means providing a plurality of exit slits for respectively transmitting selected components of said spectrum, a plurality of photocells for respectively transducing said selected components into analogous electrical signals, a plurality of capacitors for respectively charging in response to said electrical signals, a first operational amplifier characterized by the formula $G=Z_F/Z_I$, where G is gain, $Z_I$ is input impedance, and $Z_F$ is feedback impedance and characterized by a summing point electronically operative at a junction of said input impedance, said feedback impedance and said operational amplifier, sequentially operable capacitor switch means for sequentially connecting said plurality of capacitors into the position of said input impedance of said first operational amplifier, a plurality of capacitor switches for respectively controlling the flow of said electrical signals from said capacitors to said photocells, one of said capacitors being a reference capacitor, control circuitry responsive to said reference capacitor when the charge thereacross reaches a predetermined value to actuate said control circuitry in order to cause said plurality of capacitor switches to prevent further application of said electrical signals to said capacitors, a second operational amplifier characterized by the formula $G=Z_F/Z_I$, where G is gain, $Z_I$ is input impedance, and $Z_F$ is feedback impedance and characterized by a summing point electrically operative at a junction of said last-mentioned input impedance, said last-mentioned feedback impedance and said last-mentioned operational amplifier, a plurality of function generating matrixes for operationally converting input signals to output forms, sequentially operable matrix switch means for sequentially connecting said plurality of function generating matrixes into the position of said feedback impedance of said second operational amplifier, said control circuitry acting when said reference capacitor reaches said predetermined value to electrically cause said capacitor switch means and said matrix switch means to connect successive capacitors and successive matrixes respectively into said feedback position of said first operational amplifier and said feedback position of said second operational amplifier.

2. The spectroscopic apparatus of claim 1 wherein each of said function generating matrixes includes a first resistor connected between the output of said first operational amplifier and the input of said second operational amplifier, a second resistor connected between the input of said second operational amplifier and the output of said second operational amplifier, a third resistor and a fourth resistor connected in series from B+ for said first operational amplifier and said second operational amplifier to a point between said first resistor and said second resistor, a tap of said third resistor and a tap of said fourth resistor being connected through diodes together to the output of said second operational amplifier, whereby said matrix cooperates with said first operational amplifier and said second operational amplifier to generate a preselected function, and a digital voltmeter characterized by an analog input and a digital output, said digital output corresponding to successive intensities of said selected components of said spectrum in response to successive outputs of said second operational amplifier.

References Cited by the Examiner
UNITED STATES PATENTS

| | | | |
|---|---|---|---|
| 2,675,734 | 4/1954 | Hasler | 88—14 |
| 2,899,561 | 8/1959 | White | 250—83.3 |
| 2,984,146 | 5/1961 | Kwart | 88—14 |
| 3,025,746 | 3/1962 | Cary | 88—14 |
| 3,030,854 | 4/1962 | Peras | 88—14 |
| 3,067,332 | 12/1962 | Peras | 88—14 |
| 3,102,921 | 9/1963 | Peras | 88—14 |

OTHER REFERENCES

Korn et al.: Electronic Analog Computers, 1956, pages 223–226.

Mynall: "Electrical Analogue Computing," Electronic Engineering, July 1947, pages 214—217.

DAVID H. RUBIN, *Primary Examiner.*

JEWELL H. PEDERSEN, *Examiner.*